Oct. 16, 1956  P. ROBINSON  2,767,289
RESISTANCE ELEMENTS AND COMPOSITIONS
AND METHODS OF MAKING SAME
Filed Dec. 28, 1951
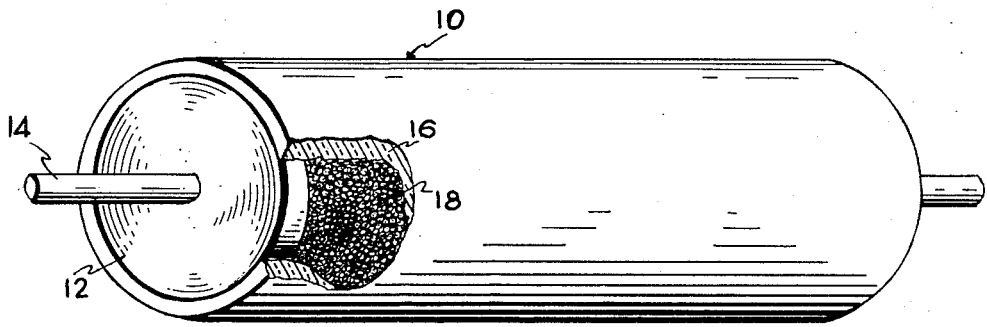
INVENTOR.
PRESTON ROBINSON
BY
HIS ATTORNEYS

United States Patent Office 2,767,289
Patented Oct. 16, 1956

2,767,289

RESISTANCE ELEMENTS AND COMPOSITIONS AND METHODS OF MAKING SAME

Preston Robinson, Williamstown, Mass., assignor to Sprague Electric Company, North Adams, Mass., a corporation of Massachusetts Application December 28, 1951, Serial No. 263,989

5 Claims. (Cl. 201—75)

This invention relates to new and improved resistance elements and compositions and to methods of making these elements and compositions. More particularly, it is concerned with resistance elements and compositions employing small inert particles covered with a vitreous or pyrolytic carbon film, and with these individual particles and with methods of making them.

In the past resistors have been made by a number of processes. Perhaps the most widely known of these processes involves the winding of a metal resistance wire upon an inert base. Resistors formed in this manner can be formed into high resistance values but require use of exceedingly fine and fragile wire. For such high resistance applications they are frequently quite large and bulky.

The second common resistor is the composition type, consisting of carbon or graphite particles dispersed in a resinous binder. These units are inexpensive but possess a strong negative temperature coefficient of resistance, high noise coefficient, high voltage coefficient, and limited operating temperature range.

The pyrolytic or vitreous carbon type resistance elements have also been used for a number of years. Their stability is good and their general properties are superior to those of the carbon composition types. Unfortunately, it is difficult to prepare pyrolytic carbon resistors so that they will have predetermined and uniform resistance values.

It is an object of this invention to overcome the aforegoing and other related disadvantages of the prior art. Another object of the invention is to produce improved resistance elements retaining many of the advantageous properties of the known vitreous carbon type resistance elements. A further object of the invention is to produce small inert resistance particles which are covered with a vitreous or pyrolytic carbon film. These and further objects will be apparent from the following description and the appended claims.

The aforesaid objects of the invention are attained through the production of a resistance particle by the decomposition of a hydrocarbon gas, as methane, propane, butane, isopropane, etc., upon an inert granular base suspended in a stream of a gas in such a manner that a pyrolytic carbon film is obtained which is uniform throughout the surface of this base. The individual coated particles produced in this manner may be combined with a suitable printing ink vehicle to make a printable resistance ink. Alternatively the coated particles can be mixed with resin binders to produce molded resistance compositions, or may be packed in a solid column in order to produce resistance units of a convenient size. With any of these methods of use they may be mixed with other known types of resistance particles, such as graphite. They may be combined with binder materials in the usual manner.

In accordance with a preferred modification of the invention, the individual vitreous carbon resistance particles are produced by the thermal decomposition of a hydrocarbon gas in a bed of inert particles, through which a sufficient volume of the hydrocarbon gas is passed to keep the bed of particles in a constant state of agitation.

A second preferred embodiment of the invention is concerned with the production of these individually coated particles by the decomposition of a hydrocarbon gas as it moves with, agitates and slightly transports a bed or mass of base particles.

A third preferred modification of the invention concerns the production of resistance particles by the thermal decomposition of hydrocarbon gas during a physical conveying of base particles by the hydrocarbon gas itself. This modification differs from the second modification of the invention in that much smaller base particles can be coated at higher gas velocities than can be employed with a "Bed" as used in the second modification of the invention. It is to be understood that no such bed or mass is utilized in producing resistance particles in accordance with this embodiment of the invention.

The inert particles which may be used with this invention may be of a wide variety of types, including powdered ceramics such as steatite, porcelain, etc. Various oxide granules such as magnesium oxide, aluminum oxide, and silica may also be employed. It is to be understood that only those particles are used which do not catalyze in any way, or which don't contain any impurities which tend to catalyze the decomposition of hydrocarbon gases that causes a "sooty" or soft carbon deposit to be produced.

Resistance deposits of lower temperature coefficients of resistance can be manufactured by incorporating within the deposit, elements whose valence is lower than carbon. Thus, aluminum, iron, beryllium, boron, chromium, and the like, may be added. This can be conveniently done by simultaneously decomposing a metal containing gas, such as vaporous boron trifluoride, or boron trichloride, to yield a co-deposit with the carbon. While the method by which these elements operate to lower these coefficients is not fully understood, it is believed that the presence of a lower valent element provides an opportunity for so-called positive hole or P-type conductance within the film in addition to the ordinary electron conductivity. The smaller elements, such as beryllium and boron, are preferred additives to the carbon deposit.

With a "fixed" bed of inert particles supported by a fluid stream three different types of fluid flow through the bed are readily observed. Below certain minimum particle sizes, and certain velocities, the particles of such a bed tend to ball together and remain that way. Under these conditions it is very difficult to obtain the desired uniform pyrolytic carbon film. With particle sizes larger than approximately 40 microns it is possible to completely suspend the individual particles in such a bed with streams of gas of approximately 0.01' per second velocity. With particles of from 40 to 50 microns in diameter at velocities from 0.01' per second to approximately 0.1' per second a "fixed" bed is in a quiescent state; that is, each individual particle is being subjected to agitation and is surrounded by a thin film or stream of gas. Usually there is little tendency of channeling under these conditions. At gas velocities greater than 0.1' per second through such a bed of inert particles, there is a decided tendency for the gas being supplied to the bottom of the bed to form into bubbles which percolate up through the bed causing some agitation, but not causing contact of the gas with each particle as desired in order to obtain a uniform coating in accordance with this invention.

The three types of flow: that of cohesive flow, aggregative or quiescent flow, or slug or bubbling flow, are found throughout the entire range of particle sizes which may be provided with pyrolytic carbon films in accordance with this invention. Of course, the individual velocities necessary to produce any of these three types of flow will vary with the particle sizes used, the gas velocities employed, the particle densities involved, the gas pressure, and other factors. Broadly, particles of from approximately 40 microns in diameter to approximately 1/8" in diameter can be satisfactorily coated with a carbon film while being suspended in a hydrocarbon gaseous fluid. A preferred range of particle sizes within this broad range is 0.004–0.0224" in diameter. With this size superficial gas velocities of from 0.175 to about 2.5' per second satisfactorily suspend a bed under substantially quiescent conditions.

The following example of this first embodiment of the invention is given by way of illustration only, and is not to be considered as limiting the invention in any manner.

*Example I*

A 4½" internal diameter tube 36" high was placed over a supporting manifold consisting of a gas inlet chamber, a packed gas distributive section and a 200 mesh supporting screen. 12.41 lbs. of steatite particles having an average particle diameter of 0.0224" were placed within the tube around the supporting screen. Methane was admitted to the bottom of the column at gradually increasing velocities. At velocities of 0.837' per second the bed of steatite particles had expanded to a height of 15.4". At this stage the bed was in substantially quiescent or quicksand conditions, and each of the individual particles was surrounded by a film of methane, and the entire bed was being subjected to a slight amount of agitation. The gas velocity was increased to 0.869' per second at a gas pressure of 110.1 lbs. per square ft. At this point the bed varied in length from 15.45 to 16.65". After this velocity was obtained the methane was heated to approximately 1,000° F. before it was introduced into the bottom of the bed. Sufficient external heat was applied to the tube to bring the entire contents of this tube, including the already heated gas, to from 1100° F. to about 1700° F., it being understood that the agitation within the bed caused by the hydrocarbon gas was sufficient to partially equalize the temperature throughout the bed, and to shift the individual particles of the bed from various "cold" to various "hot" spots throughout the column. After a period of 2 hrs. the heating was stopped and the bed was allowed to cool slowly while being subjected to agitation by methane. After approximately 30 minutes cooling this agitation was stopped and the coated particles were removed from the tube.

From the above example it will be realized that there is a large interrelation between particle size, velocity of the gas, the pressure of the gas, and the viscosity of the gas used to suspend the particles. In general the velocity required is independent of the gas density except at extremely high pressures; however, it is directly proportional to the density of the solids, and inversely proportional to the viscosity of the gas. In a fixed bed of this type it is readily realized why the velocity must be proportional to the solid density, as must be the pressure, because the force applied by the moving gas has to be sufficient to lift the entire mass of particles forming the fixed bed in order for there to be any suspension of the individual particles. With slug flow or violent agitative flow, it is necessary to use a much higher column for a fixed bed than is required when the velocities are such as to create quiescent agitative flow, because the individual slugs or bubbles of gas under this type of flow tend to carry a few particles far above the normal bed height. In many respects the action within a fixed bed is comparable to the action obtained in the backwashing of a sand filter.

When a moving bed of suspended particles is employed in accordance with the second embodiment of the invention, the coating is generally similar to that of a fixed bed with a few additional features. In this type of operation it is preferable to utilize a solid column to which solids are constantly being added at the bottom along with the air stream, and from which coated particles are constantly being taken at the top. It is seen that when a moving bed of particles is employed in this invention the coating operation is a continuous one, whereas with the fixed bed the operation is largely of a batch variety.

For any given gas velocity used to suspend particles a wide variety of feed rates to the reaction column is possible up to a certain point at which the amount of gas supplied is unable to circulate the solid particles with a steady operation. After this point is reached the gas being supplied to the reaction column breaks down in bubbles, which almost blow the bed out of the reaction column in cycles. This type of operation corresponds to "slugging" in a fixed bed. The concentration of solids present in the reaction column of this modification are of course roughly proportional to the feed rate employed at a given gas velocity. One factor which must be taken into consideration in determining this required gas velocity is the slip velocity of the particles suspended within the movable bed. This may be defined as the gas velocity less the solids velocity. Obviously, the gas must travel upwards much faster than the suspended particles. Care must be taken that the differential between the velocity of the gas and the velocity of the particles is positive in order to maintain the bed in an upwardly moving condition.

Solids recirculation rates of from 2 to 55 lbs. per square ft. and gas velocities of from 12 to 40' per second are preferably used in order to give the most advantageous results in the production of pyrolytic carbon films in a moving bed. Perhaps the manner in which individual particles are coated with such films in moving beds will be best understood with reference to the following example, which is given for purposes of illustration only, and is not to be considered as limiting this modification of the invention.

*Example II*

A 10' 1¼" internal diameter tube was set in a perpendicular position so as to have an air inlet and solids inlet positioned immediately below its bottom, and a cyclone separator connected to its top. An appropriate feed type arrangement was provided between the cyclone separator and the inlet at the bottom of the tube, together with means for introducing new particles into the apparatus at the bottom of the tube and means for recovering the covered particles at the top of the tube. 0.0016" diameter steatite particles were introduced into the bottom of this reaction tube at a rate of 1.98 lbs. per square ft. of the reaction tube diameter per second along with a stream of methane until a bed density within this reaction tube of 1.02 lbs./cubic ft. was built up. The gas, butane, was introduced at a rate of approximately 4.00' per second velocity based on the empty cross section of the tube. The slip velocity of the particles was calculated to be 1.98' per second once the stable conditions of bed density, as indicated, had been achieved. At this point sufficient heat was applied to the outside of the tube so as to bring the gas, and the individual particles within this tube, to a temperature of approximately 1400° F., at which temperature the butane decomposed to produce pyrolytic carbon films on the individual steatite particles. The partially coated particles produced from one pass through the reaction column were recirculated for a period of 2 hrs. in order to obtain the desired resistance film thickness. At the end of this period the heat was discontinued, and the particles which had been treated were separated from the gas in the cyclone separator and used in resistance compositions as will be explained later.

It is seen that much higher gas velocities are required in the treatment of the moving bed than are required with a fixed bed. Velocities of from 3.5' per second to 40' per second based on the empty cross section of the reaction tube are generally satisfactory.

A mode of operation of a moving bed in which the individual particles being coated move against the direction of the gas flow is possible, but does not offer the advantage of easy control and through agitation obtained when the slip velocity of the particles is positive. However, satisfactory resistance coatings can be obtained in this manner.

With either a continuous bed or mass process, or a fixed bed floating process, it is possible to pack the reaction column or vessel in any of the conventional manners, as with Berl saddles, Raschig, rings, spheres, so as to further agitate the flow within the fluidized bed. Packed beds of this variety only expand when the pressure gradient of the gas between the top and the bottom of the bed becomes equal to or greater than the buoyant weight of the bed. If heavy enough packing materials are employed it is possible to suspend the individual particles being coated in and around the packing without actually expanding it.

With the third modification of the invention, particles of from 10 to 220 microns in diameter are passed through a continuous flow pipe along with a hydrocarbon gas at comparatively high velocities of from 50 to 150 ft. per second. In general, solids feed rates from about 0.20 to about 1.60 lbs. per second in a 17 mm. diameter tube give satisfactory results. This type of gas treatment has the advantage in that the conduit employed can be long enough so that it is not necessary to recirculate the individual particles in order to build up a thick, effective, resistance film. This embodiment of the invention will be best apparent from the following example, which is given only by way of illustration.

*Example III*

0.40 lb. per second of steatite particles 40 to 50 microns in diameter were passed through a 17 mm. internal diameter closed tube 25' long by a stream of methane traveling at a velocity of 100' per second. Throughout the length of the tube external heat was applied sufficient to heat the gas and particle contents to a temperature of approximately 1500° F., at which temperature a sufficient proportion of the methane was decomposed to produce a satisfactory pyrolytic carbon coating.

With any of the three modifications of the broad process of this invention producing pyrolytic carbon films, it is possible to employ a variety of heating means. The conduit, container, or tube employed may be externally heated. In addition, auxiliary heating means, such as resistance wire elements, may be positioned internally within the reaction space. If packed columns or stacks are used, such heating elements may be incorporated into heavy immobile packings. Of course the gas employed can be pre-heated to any desired temperature below its decomposition point. The individual particles employed can also be pre-heated as in an oven before they are introduced into the reaction container. If desired, the individual particles can also be heated by passing through them an inert gas heated far beyond the reaction temperature prior to the passage of the hydrocarbon gas. Also auxiliary heating means such as induction coils around reaction vessels can be utilized.

Resistance particles formed in accordance with any of the three preceding embodiments of the invention are capable of wide utility in a variety of electrical applications. Because of the fact that they are composed of a series of inert particles covered with thin pyrolytic carbon films they possess many if not all the advantages of the conventional pyrolytic type of resistance elements. They are, for example, quite suitable for high frequency applications.

In order to use the individual elements for such applications it is necessary to position them with their coatings in contact with one another, so that electric current may pass from the surface of one particle to the surface of the next particle. This can be done by packing an electrically non-conductive tube with these particles, and applying suitable terminal connections to both ends of the tube so that any current has to pass from one terminal through the surface of a series of particles, and thence out the other terminal. Extremely high resistance values can be obtained in this type of unit.

The single figure of the accompanying drawing is a pictorial view of such an embodiment of this invention. In this figure is shown a resistance element 10 including a non-conductive tube 16, packed between end walls 12 with small particles 18 coated with pyrolytic carbon resistance films. Electric terminals 14 engage the resistance particles 18 from both ends of the tube.

The individual pyrolytic carbon films of this invention may also be incorporated within a resin binder either with other conductive particles or alone, depending upon the circumstances, and either cast or molded into solid resinous elements. Suitable resins are n-vinyl carbazole, styrene, pentachlorostyrene, phenol-formaldehyde, urea-formaldehyde, and polytetrafluoroethylene, silicones, and cellulose acetate. This list is by no means exclusive for other resins can also be used. Among the suitable particles which can be admixed in such resinous compositions with particles of this invention are graphite particles, small particles of metal alloys, and inert particles provided with metal or alloy surface coatings. The exact proportions of resin and pyrolytically coated conductive particles which should be used for any specific application, and whether these particles should be used alone or in conjunction with other materials will of course depend upon the specific application involved. In general, from 5 to 60% of coated particles should be used with from 40 to 95% of binder. Preferably from about 10 to about 20% coated particles are employed. By using resistance particles of two or more types together it is frequently possible to retain certain desirable characacteristics from each type of particle.

Such mixtures can also be formed into resistance inks in any of the conventional manners presently known to the art. This includes resin inks employing only particles of this invention, and mixtures of these and other particles of this invention, and mixtures of these and other particles as indicated above. Frequently, for such applications as these inks, it is desirable to grind the pyrolytic coated particles before using them.

Vitreous enamel (inorganic) binders such as potassium lead silicate may also be used with coated particles in approximately the same proportions indicated above instead of organic binders for the production of resistors and resistance compostions.

Those skilled in the art will realize that this invention is capable of wide utility. It is not to be limited except by the scope of the appended claims, as many changes within the inventive concept can be readily made by those skilled in the art.

I claim:

1. A small inert resistance particle comprising an inert ceramic base covered throughout its surface with a uniform pyrolytic carbon resistance film.

2. A pyrolytic carbon resistance particle comprising an inert ceramic base particle between about 40 microns and ⅛" in diameter covered throughout its surface with a uniform pyrolytic carbon resistance deposit.

3. A resistance ink comprising an electrically non-conductive resin binder and mixed with small inert ceramic particles having throughout their surfaces a uniform pyrolytic carbon resistance film.

4. A resistance composition comprising an inert binder mixed with inert ceramic particles having uniform pyrolytic carbon resistance films throughout their surfaces.

5. A resistance element comprising a non-conductive tube, small inert ceramic particles coated throughout their surfaces with uniform pyrolytic carbon resistance films packed throughout said tube, and electric lead conductive terminals attached to the ends of said tube and pressing against said resistance particles.

References Cited in the file of this patent

UNITED STATES PATENTS

| | | |
|---|---|---|
| 1,256,599 | Schoop | Feb. 19, 1918 |
| 1,927,185 | Power et al. | Sept. 19, 1933 |
| 1,973,703 | Goucher et al. | Sept. 18, 1934 |
| 1,998,060 | Seibt | Apr. 16, 1935 |
| 2,061,107 | Schellenger | Nov. 17, 1936 |
| 2,161,950 | Christensen | June 13, 1939 |
| 2,179,566 | Stoekle | Nov. 14, 1939 |
| 2,196,128 | Stuart | Apr. 2, 1940 |
| 2,414,625 | Abrams et al. | Jan. 21, 1947 |
| 2,472,801 | Barfield et al. | June 14, 1949 |
| 2,635,947 | Reed | Apr. 21, 1953 |

OTHER REFERENCES

Planer: "Electronic Engineering," March 1946, pages 66, 67, 68 and 97.